(12) United States Patent
Cvejanovic et al.

(10) Patent No.: US 11,556,493 B2
(45) Date of Patent: Jan. 17, 2023

(54) SYSTEM COMPONENT HAVING A CONFIGURABLE COMMUNICATION BEHAVIOR, AND METHOD FOR OPERATING SUCH A SYSTEM COMPONENT

(71) Applicant: Robert Bosch GmbH, Stuttgart (DE)

(72) Inventors: Dorde Cvejanovic, Munich (DE); Rainer Dorsch, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/289,526

(22) PCT Filed: Jan. 9, 2020

(86) PCT No.: PCT/EP2020/050417
§ 371 (c)(1),
(2) Date: Apr. 28, 2021

(87) PCT Pub. No.: WO2020/160868
PCT Pub. Date: Aug. 13, 2020

(65) Prior Publication Data
US 2021/0397579 A1 Dec. 23, 2021

(30) Foreign Application Priority Data
Feb. 7, 2019 (DE) .......................... 102019201533.6

(51) Int. Cl.
*G06F 13/42* (2006.01)
*G06F 9/445* (2018.01)
(Continued)

(52) U.S. Cl.
CPC ...... *G06F 13/4291* (2013.01); *G06F 9/44505* (2013.01); *G06F 13/362* (2013.01); *G06F 13/4022* (2013.01); *G06F 2213/0016* (2013.01)

(58) Field of Classification Search
CPC ............. G06F 13/4291; G06F 9/44505; G06F 13/362; G06F 13/4022; G06F 2213/0016;
(Continued)

(56) References Cited

U.S. PATENT DOCUMENTS 5,737,524 A * 4/1998 Cohen ................... G06F 15/177
710/301
7,353,259 B1 * 4/2008 Bakke ................. G06F 11/2028
714/4.11
(Continued)

FOREIGN PATENT DOCUMENTS

| | | |
|---|---|---|
| JP | 2005258575 A | 9/2005 |
| JP | 2017504228 A1 | 2/2017 |
| WO | 2017155897 A1 | 9/2017 |

OTHER PUBLICATIONS

International Search Report for PCT/EP2020/050417, dated Mar. 4, 2020.

*Primary Examiner* — Faisal M Zaman
(74) *Attorney, Agent, or Firm* — Norton Rose Fulbright US LLP; Gerard Messina (57) ABSTRACT

A system component having a configurable communication behavior. The system component includes at least one interface for a data bus for the communication with at least one further system component. A defined communications protocol for the transmitting and receiving of data and bus commands is used on the data bus. The communications protocol provides that the at least one further system component queries the communication behavior of the system component via the data bus to adapt its own communication behavior to that of the system component. The system component includes a register for configuration data that define the communication behavior of the system component on the data bus, the register being connected to the data bus so that the configuration data stored in the register are
(Continued)

available on the data bus. The function scope of the system component allows for different communication behaviors.

15 Claims, 4 Drawing Sheets

(51) Int. Cl.
  *G06F 13/362* (2006.01)
  *G06F 13/40* (2006.01)
(58) Field of Classification Search
  CPC .............. G06F 13/4282; G06F 13/385; G06F 13/4027; G06F 13/4265; G06F 13/10; G06F 13/14; G06F 13/423; H04L 12/403; H04L 2012/40208; H04L 12/40169
  USPC ............................................. 710/105, 11, 313
  See application file for complete search history.

(56) References Cited

U.S. PATENT DOCUMENTS

| | | | | |
|---|---|---|---|---|
| 2003/0101307 | A1* | 5/2003 | Gemelli | G06F 30/30 710/305 |
| 2006/0284876 | A1* | 12/2006 | Low | G06F 13/28 345/536 |
| 2008/0152417 | A1* | 6/2008 | Heaton | B41J 3/36 400/693 |
| 2010/0205326 | A1 | 8/2010 | Deshpande et al. | |
| 2016/0105320 | A1* | 4/2016 | Osterberg | H04L 41/0846 709/208 |
| 2017/0075852 | A1* | 3/2017 | Mishra | G06F 13/4282 |
| 2017/0097912 | A1* | 4/2017 | Takahashi | G06F 13/404 |
| 2017/0153999 | A1* | 6/2017 | Yamashita | H04N 5/907 |
| 2017/0255588 | A1* | 9/2017 | Pitigoi-Aron | G06F 13/364 |
| 2017/0286358 | A1* | 10/2017 | Srivastava | G06F 13/1673 |
| 2018/0181532 | A1* | 6/2018 | Pitigoi-Aron | G06F 13/4291 |
| 2018/0225251 | A1* | 8/2018 | Sthoeger | G06F 13/4291 |
| 2018/0329857 | A1* | 11/2018 | Mishra | G06F 13/4282 |
| 2018/0357067 | A1* | 12/2018 | Mishra | G06F 9/4403 |
| 2018/0357194 | A1 | 12/2018 | Ulmer et al. | |
| 2018/0365188 | A1* | 12/2018 | Srivastava | G06F 13/4086 |
| 2019/0095273 | A1* | 3/2019 | Graif | G06F 13/40 |
| 2019/0129881 | A1* | 5/2019 | Wietfeldt | G06F 9/542 |
| 2019/0171609 | A1* | 6/2019 | Mishra | H04L 43/0894 |
| 2019/0238362 | A1* | 8/2019 | Mishra | G06F 13/4291 |
| 2019/0266122 | A1* | 8/2019 | Pitigoi-Aron | G06F 13/4291 |
| 2020/0012612 | A1* | 1/2020 | Takahashi | G06F 13/4081 |
| 2020/0097434 | A1* | 3/2020 | Mishra | G06F 13/4282 |
| 2020/0159689 | A1* | 5/2020 | Koshisaka | G06F 13/404 |
| 2020/0272532 | A1* | 8/2020 | Takahashi | G06F 11/0751 |

* cited by examiner

| Open Drain | Open Drain | Hand off | Push-Pull | Drive High or Low, and then High-Z | Push-Pull |
|---|---|---|---|---|---|
| Start (S) | Slave_addr_as_IBI/R | Master_ACK | SCL High | Slave_byte | T | Repeated Start (Sr) |

| Open Drain | Open Drain | Push-Pull |
|---|---|---|
| Start (S) | Slave_addr_as_IBI/R | Master_ACK | Any I3C Action |

SYSTEM COMPONENT HAVING A CONFIGURABLE COMMUNICATION BEHAVIOR, AND METHOD FOR OPERATING SUCH A SYSTEM COMPONENT

FIELD

The present invention relates to a system component having a configurable communication behavior and to a method for operating such a system component.

The present invention relates to systems that include multiple system components which communicate via a data bus, i.e., exchange data via the data bus. Generally, at least one of the system components functions as what is known as a master in that this system component coordinates the data exchange between at least two system components. At least one other system component functions as a so-called slave in that it participates in a data communication that is coordinated by the master. Examples of such systems are sensor systems in consumer electronics applications such as smartphones, wearables, etc., IoT-systems, navigation systems and also sensor systems in automotive applications.

BACKGROUND INFORMATION

A new interface I3C was developed under the auspices of the Mobile Industry Processor Interface Alliance, abbreviated as MIPI Alliance. The MIPI Alliance is a company network with the goal of developing and propagating hardware and software interfaces between a chip set and peripheral components such as sensors and displays. The I3C standard builds on the I2C standard, which is the de facto most prevalent 2-pin serial bus protocol standard for low-speed peripheral devices and sensors. The I3C bus protocol offers some significant improvements over the I2C bus protocol, e.g., a dynamic arbitration of bus addresses, higher data rates, simplified electrical demands on the master and slave, in-band interrupts, and hot-join mechanisms.

Figure 2:
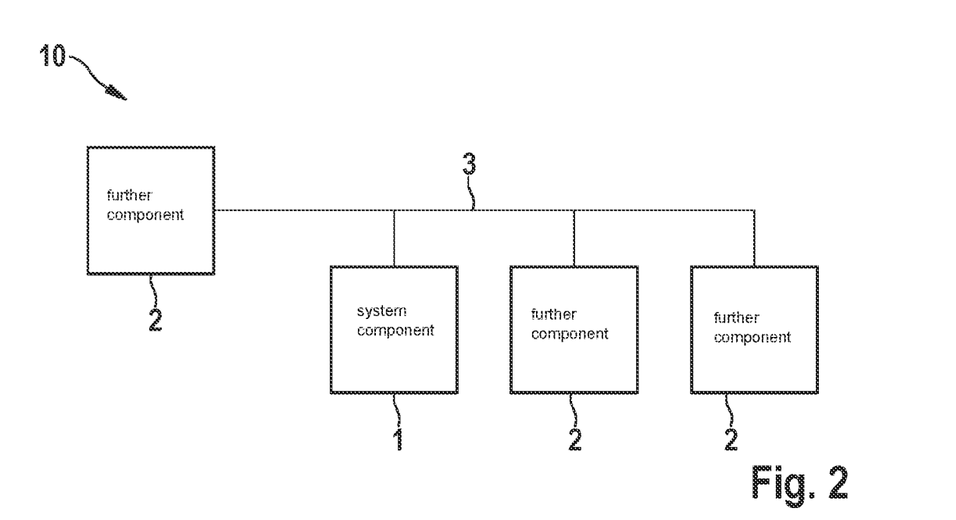
FIG. 2 shows a schematic representation in order to describe an I3C bus system.

FIG. 2 shows an I3C bus system 10. Each system component 1 includes a first register, a bus characteristic register (BCR), and a device characteristic register (DCR). The device characteristic register describes the type of system component 1, for instance that system component 1 is a sensor, and possibly further sensor-specific information. In the bus characteristic register, the role of system component 1 is defined, among other things, such as whether system component 1 functions as a master or as a slave. In addition, the communication behavior of system component 1 is defined. In particular, it is stored in the bus characteristic register whether system component 1 supports an in-band interrupt (IBI) function with payload or without payload.

In conventional I3C system components (slave and/or master), the communication behavior is defined in advance and correspondingly stored in the bus characteristic register.

The I3C bus protocol provides that the master queries the communication behavior of the slave stored in the bus characteristic register in order to then adapt its own communication behavior accordingly. However, in the case of the IBI function, this is possible only if the master is able to support both IBI without payload and IBI with payload. A master which supports only IBI without payload can therefore not communicate with slaves for whose communication behavior IBI with payload is specified.

The use of the I3C bus protocol for the communication between system components is described in PCT Application No. WO 2017 155897 A1, for example.

SUMMARY

The present invention relates to a system component having a configurable communication behavior and a method for operating such a system component.

An example embodiment of the present invention provides a system component having at least one interface for a data bus for the communication with at least one further system component. A defined communications protocol is used on the data bus for the transmitting and receiving of data and bus commands. In addition, the communications protocol provides that the at least one further system component queries the communication behavior of the system component via the data bus in order to adapt its own communication behavior to that of the system component. Moreover, the system component includes a register for configuration data that define the communication behavior of the system component on the data bus. The register of the system component is connected to the data bus so that the configuration data stored in the register are available on the data bus, e.g., are made available to further system components via the data bus. The system component is characterized in that the function scope of the system component allows for different communication behaviors. In addition, the communication behavior of the system component is selectable within the framework of the function scope in that the configuration data corresponding to the selected communication behavior are able to be loaded into the register.

The communication behavior describes the behavior of a system component with regard to other system components that are in connection with the same data bus. The communication behavior of a system component according to the present invention is able to be modified or adapted within the framework of its function scope. The communication behavior includes the definition of the system component as a master or a slave. In addition, the communication behavior describes whether the system component in the role of a slave provides the IBI function with payload or without payload.

The IBI function with payload means that the master is obligated to read out the payload (data such as measuring data from a sensor). The master is obligated to reserve the data bus for the corresponding slave until it has transmitted the data. The data are thus always sent along as soon as a slave has received the release to the data bus. This may be disadvantageous if very large data packets are involved, e.g., in the case of data of a touch display, because the data bus is unable to be used by any other system component for the duration of the data transmission.

The IBI function without payload means that the slave transmits a request to the master to the effect that data are available for a transmission via the data bus, for instance, and the master has control over the start of the data transmission.

Moreover, the present invention provides a method for operating a system component. In accordance with an example embodiment of the present invention, for the communication with at least one other system component, the system component is connected to a data bus via at least one interface. A defined communications protocol is used for the transmitting and receiving of data and bus commands on the data bus. The communications protocol provides that the at least one further system component queries the communication behavior of the system component via the data bus in order to adapt its own communication behavior to that of the system component. Furthermore, the system component includes at least one register for configuration data. The configuration data define the communication behavior of the system component. The register of the system component is connected to the data bus so that the configuration data stored in the register are available on the data bus, for instance are made available to further system components via the data bus. The function scope of the system component allows for different communication behaviors of the system component on the data bus. The present method is characterized in that the communication behavior of the system component is configured by loading the configuration data corresponding to a selected communication behavior into the register.

A preferred application field of the present invention are sensor components for acquiring and converting measuring variables into electrical sensor signals, which function as a system component of a higher-level system. Depending on the type of sensors, this may involve a navigation system, for instance, or a mobile device that evaluates the sensor data for higher-level applications such as for a step counter.

In accordance with an example embodiment of the present invention, a system component is developed in such a way that its communication behavior is configurable within the framework of its function scope, for example so that it alternatively supports IBI with payload or IBI without payload. In an advantageous manner, the system component may thus be used in any system regardless of the variant (with or without IBI payload) for which the system was configured by a developer.

In an advantageous manner, the function scope of the system component is able to be adapted to the requirements of the system by the configuration of the bus characteristic register.

Thus, a manufacturer no longer has to provide two system components having the same application spectrum for use in a system in an IBI configured with payload or without payload. The system component is appropriately configured for the system. An exchange of system components is therefore not necessary even if different communication behaviors are demanded.

Preferred further refinements of the present invention are disclosed herein.

According to one preferred embodiment of the present invention, the system component is I2C-compatible and/or I3C-compatible.

This embodiment is advantageous insofar as the system component is able to communicate with further system components both via the data bus in a system according to the I2C bus protocol or the I3C bus protocol. In an advantageous manner, the I3C bus protocol standard is backwardly compatible.

According to one preferred embodiment of the present invention, the function scope of the system component according to the present invention allows for an operation alternatively as a master or a slave.

In this case, the system component is able to communicate with further system components via the data bus both as a slave and as a master.

According to a preferred embodiment of the present invention, the function scope includes an in-band interrupt capability alternatively with payload or without payload.

In an advantageous manner, depending on the selected communication behavior, the data load on the data bus is able to be adapted according to the requirements of the system. The in-band interrupt capability with payload includes a co-transmission of the payload, e.g., of sensor data, with the interrupt set by the slave. In the in-band interrupt capability without payload, a master must already specify in advance in which way the communication or the data exchange takes place. Both variants are provided by the I3C bus protocol. However, the systems that correspond to the I3C bus protocol are restricted to one variant, either IBI with payload or without payload. In an advantageous manner, a slave is able to be configured for the corresponding application case or for the corresponding system and for the use in the application or system.

According to a preferred embodiment of the present invention, at least one internal or external memory device for configuration data is provided, in particular a non-volatile memory. The configuration data corresponding to the selected communication behavior are able to be loaded into the register from this memory device.

For instance, this embodiment is advantageous insofar as the IBI value (with or without payload) is able to be read out from the memory and loaded into the register in order to adapt the communication behavior of the system component functioning as the slave to the requirements of the master. As a rule, the manufacturer of the system component defines the IBI value in the BCR register of a system component in advance. In the example embodiment of the present invention discussed here, the IBI behavior of the system component is configurable by reading out an IBI value from an internal or external memory device at the start of the initialization of the system component. After the readout, the existing IBI value in the register is overwritten so that the system component is initialized by the new communication behavior. The bus component logs in to the data bus using this communication behavior and notifies the master of the manner in which it communicates. The IBI value written into the register remains unchanged during the entire operation of the system component.

By the configuration of the register prior to or following the initialization of the system component and prior to or following the log-in to the data bus, the system component is able to be used in any system regardless of the communication behavior of the master in a system.

According to a preferred embodiment of the present invention, the communication behavior is selectable on the basis of bus commands and/or data received via the data bus, and corresponding configuration data are able to be loaded into the memory device and able to be loaded from the memory device into the register.

In an advantageous manner, a BCR value is able to be agreed upon between a master and a slave by an I3C custom command code (CCC). Custom command codes are available via the I3C protocol or custom command codes may be defined in the protocol. Using these, the value in the register is able to be modified or adapted according to the system requirements. The I3C custom command code used for this function should be defined in advance via a private protocol and be device-specific.

In addition, a BCR value is able to be agreed upon between the master and the slave via a private I3C protocol. The private I3C protocol that is used for this function is either predefined or device-specific. This embodiment has the advantage that it is not necessary first to define a custom command code in consultation with the MIPI Alliance. Instead, a private protocol may be internally defined by which direct access to the BCR register without CCC is possible in order to modify the value of the BCR register.

According to one preferred embodiment of the present invention, the configuration data are loaded into the register after the system component has been switched on in each case, but still prior to the first query of the communication behavior by the further system component.

In an advantageous manner, the initialization of the system component to the value stored in the BCR register takes place before the system component is initialized to the data bus by the master. As a result, the system component is able to be appropriately initialized for each system and may be used in this system.

In one embodiment of the present invention, the value of the BCR register is provided with a default value, e.g., IBI without payload. For use in an I3C system with IBI with payload, the system component is correspondingly reconfigured during its initialization so that it can also be used in the particular system. For this purpose, the value for IBI with payload is stored in the memory device. It is read out, and the value in the BCR register is overwritten.

According to a preferred embodiment of the present invention, the configuration data are loaded into the register from an internal or external memory device for configuration data, in particular from a non-volatile memory.

According to a preferred embodiment of the present invention, the communication behavior is configured on the basis of at least one predefined and/or device-specific bus command, and corresponding configuration data are loaded into the register or the memory device.

According to one preferred embodiment of the present invention, the communication behavior is configured on the basis of at least one predefined and/or device-specific data communication, and corresponding configuration data are loaded into the register or into the memory device.

Additional features and advantages of embodiments of the present invention result from the following description with reference to the figures.

BRIEF DESCRIPTION OF THE DRAWINGS

Below, the present invention is described based on exemplary embodiments in conjunction with FIGS. 1 through 7.

Identical or functionally equivalent elements have been provided with the same reference numerals in the figures.

DETAILED DESCRIPTION OF EXAMPLE EMBODIMENTS

Figure 1:
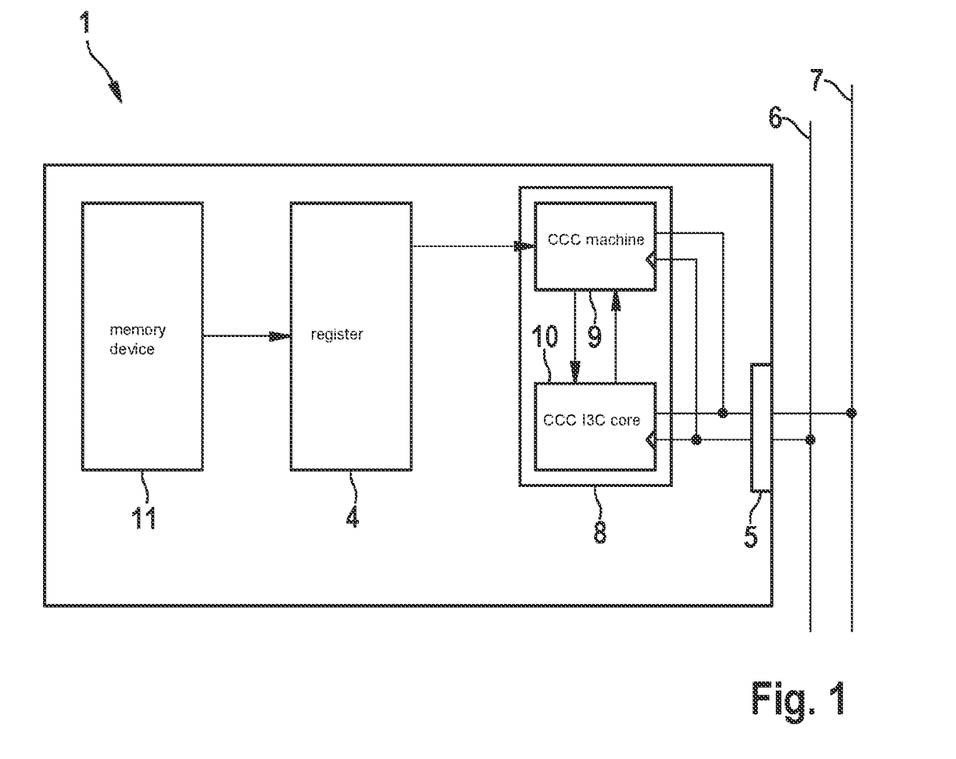
FIG. 1 shows a schematic representation in order to describe a system component according to an example embodiment of the present invention.

FIG. 1 is a schematic representation in order to describe a system component according to one example embodiment of the present invention.

Reference numeral 1 in FIG. 1 denotes a system component which includes an interface 5. System component 1 is connected via interface 5 to data bus 3 (not shown). Data bus 3 includes a serial clock line 6 and a serial data line 7. In addition, system component 1 includes a processor unit 8, a register 4 and a memory device 11. Memory device 11 is developed to provide configuration data for the configuration of the communication behavior of system component 1. Memory device 11 in FIG. 1 is developed as an internal memory device, which means that it is part of system component 1. However, the configuration data may also be loaded into register 4 from an external memory device such as a non-volatile memory, an electric switch, an electrically conductive pin. The external memory device is not restricted to the mentioned examples. In addition, further developments of devices may be used, which are developed to store data and to load the data into register 4. Register 4, in particular the BCR register, receives a value from memory device 11 prior to the initialization of system component 1. This value is used to configure the communication behavior of system component 1. More specifically, the IBI function with or without payload is configured and thus the manner in which system component 1 communicates via data bus 3. Processor unit 8 is configured to develop a CCC machine 9 and a CCC I3C core 10. In an alternative embodiment, CCC machine 9 and CCC I3C core 10 may also be developed on two separate processor units. CCC machine 9 is a part of the slave in the I3C protocol and is used for the normal reading and writing of data. Direct access to the data is provided by CCC machine 9. A further communication with the slave according to the I3C bus protocol may take place via custom command codes CCC. With the aid of custom command codes, for example, the power mode, the data protocol is able to be changed to "single data rate" and "double data rate". CCC I3C core 10 receives the custom command codes via interface 5 and decodes them and correspondingly implements the commands or responds to them. An exemplary custom command code, transmitted by the master of data bus 3, is the readout of the BCR register of system component 1 during the log-in of system component 1 to data bus 3. System component 1 receives the CCC, and the CCC I3C core 10 decodes the received command and outputs a corresponding command to CCC machine 9, which reads out register 4. The read-out value of register 4 is transmitted via interface 5 of system component 1 via data bus 3 to further system component 2, e.g., in the function of a master.

FIG. 2 is a schematic representation in order to describe an I3C bus system.

FIG. 2 shows an I3C bus system 10. I3C bus system 10 includes a system component 1, which is connected via a data bus 3 to further system components 2 for a communication. System component 1 may be developed as a slave or as a master in its function scope. If system component 1 functions as a slave, then one of the further components 2 is developed as a master.

Figure 3:
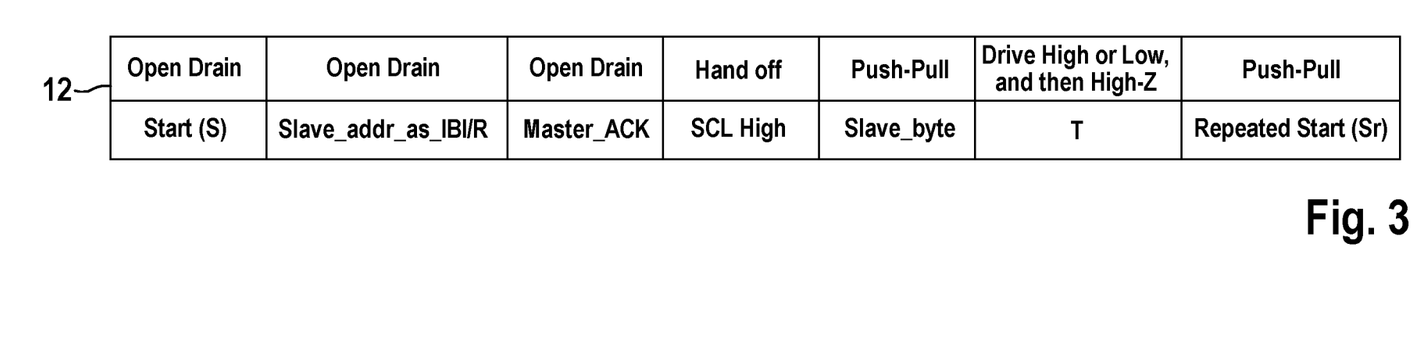
FIG. 3 shows a schematic representation in order to describe the in-band interrupt capability with payload, in accordance with an example embodiment of the present invention.

FIG. 3 is a schematic representation in order to describe the in-band interrupt capability with payload.

In FIG. 3, in-band interrupt 12 with payload is shown. In-band interrupt 12 is a possibility for system component 1 functioning as a slave to inform the master via data bus 3 that a communication between the master and the slave is to be established. Under the I3C protocol, the slave has no possibility of starting a communication or of transmitting data via the bus without receiving a clock from the master. For instance, by the transmittal of an IBI the slave is able to inform the master that data are available that are to be transmitted via data bus 3. The master responds to the IBI according to a prioritization and controls the communication of the slave by making corresponding clocks available.

The master transmits a start bit "start (S)" via data bus 3 to system component 1. The IBI slave transmits its address via the bus to the master when the master makes a clock available. By the "Master ACK", the master signals to the slave that it has recognized that a slave wants to gain access to the bus. The in-band interrupt 12 is developed with payload. This means that the master is obligated to provide the slave with further clocks for at least one byte and to transmit data via data bus 3 for as long as the slave supplies data. Data bus 3 is released again only after the communication has been concluded.

Figure 4:
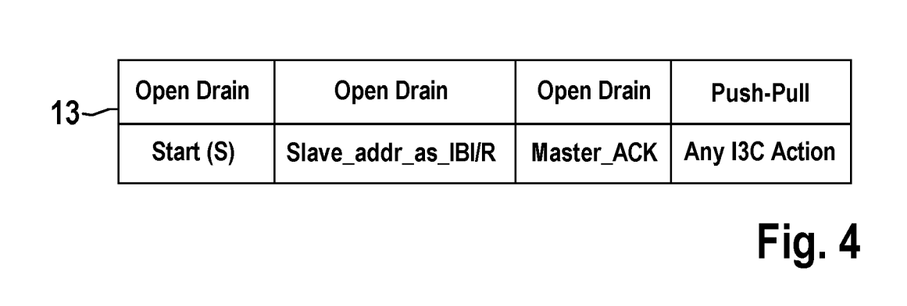
FIG. 4 shows a schematic representation in order to describe the in-band interrupt capability without payload, in accordance with an example embodiment of the present invention.

FIG. 4 shows a schematic representation in order to describe the in-band interrupt capability without payload.

FIG. 4 shows in-band interrupt 13 without payload. In this case, after transmitting the "Master ACK", the master is able to decide which function is to be carried out. For example, the master may start reading out the data from the slave or establish a communication with a further slave because this slave possibly has a higher priority. The master is not bound by the request of the slave.

Figure 5:
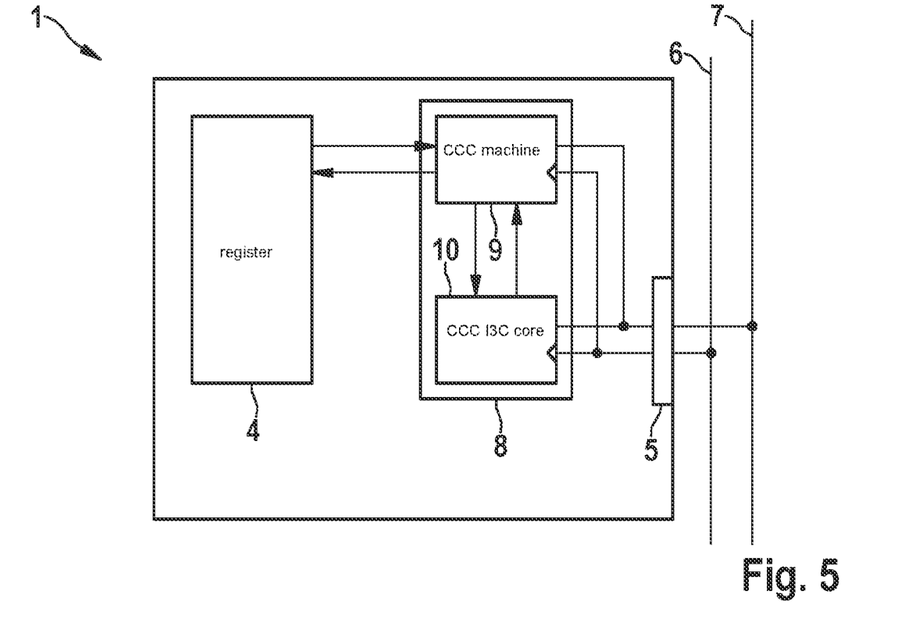
FIG. 5 shows a schematic representation in order to describe a system component according to a second example embodiment of the present invention.

FIG. 5 is a schematic representation in order to describe a system component according to a second embodiment of the present invention.

Reference numeral 1 in FIG. 5 denotes a system component which includes an interface 5. System component 1 is connected via interface 5 to data bus 3 (not shown). Data bus 3 includes a serial clock line 6 and a serial data line 7. In addition, system component 1 includes a processor unit 8 and a register 4. Processor unit 8 is configured to develop a CCC machine 9 and a CCC I3C core 10. In an alternative embodiment, CCC machine 9 and I3C core 10 may also be developed on two separate processor units. CCC machine 9 is a part of the slave in the I3C protocol and is used for the normal reading and writing of data. CCC machine 9 provides direct access to the data. A further communication with the slave according to the I3C bus protocol exists via custom command codes. For example, with the aid of custom command codes, the power mode, the data protocol is able to be changed to "single data rate" and "double data rate". CCC I3C core 10 receives the custom command codes via interface 5 and decodes them and correspondingly implements the commands or responds to them. An exemplary custom command code transmitted by the master of data bus 3 is the readout of the BCR register of system component 1 during the log-in of the bus component to data bus 3. System component 1 receives the CCC, and CCC I3C core 10 decodes the received command and gives a corresponding command to CCC machine 9, which reads out register 4. The read-out value of register 4 is transmitted via interface 5 of system component 1 via data bus 3 to further system component 2, e.g., in the function of a master.

In the embodiment of the present invention, the value of register 4, and thus the communication behavior of system component 1, is changed via a received custom command code (CCC). Device-specific CCCs are provided in the I3C bus protocol, which may be used for this purpose. With their aid, the values of BCR register 4 are able to be configured. In addition, new CCCs may be defined and the I3C bus protocol be expanded. The newly defined CCCs may be used to configure the values of BCR register 4.

Figure 6:
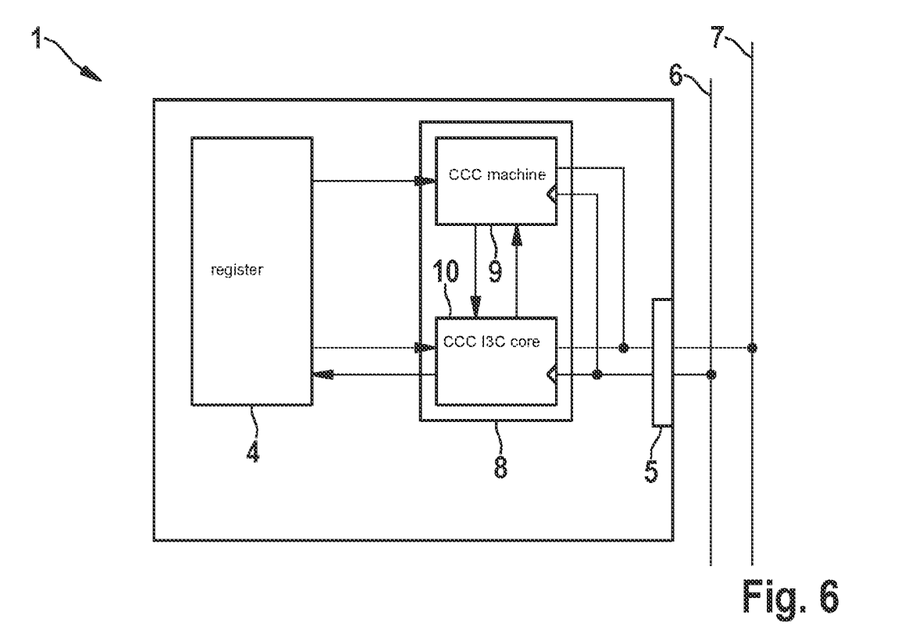
FIG. 6 shows a schematic representation in order to describe a system component according to a third example embodiment of the present invention.

FIG. 6 is a schematic representation in order to describe a system component according to a third embodiment of the present invention.

In FIG. 6, I3C CCC core 10 has a connection to register 4. In the embodiment of the present invention, no configuration of register 4 takes place via the custom command codes of the I3C bus protocol. In the embodiment shown in FIG. 6, read and write requests are provided via the direct connection of I3C CCC core 10 to register 4. The communication between master and slave is defined in a private protocol, which is executed on I3C CCC core 10. The master has the ability to write to BCR register 4 and to read from it. For this purpose, the address of register 4 is defined in the private protocol as are commands for the reading and writing of register 4.

Figure 7:
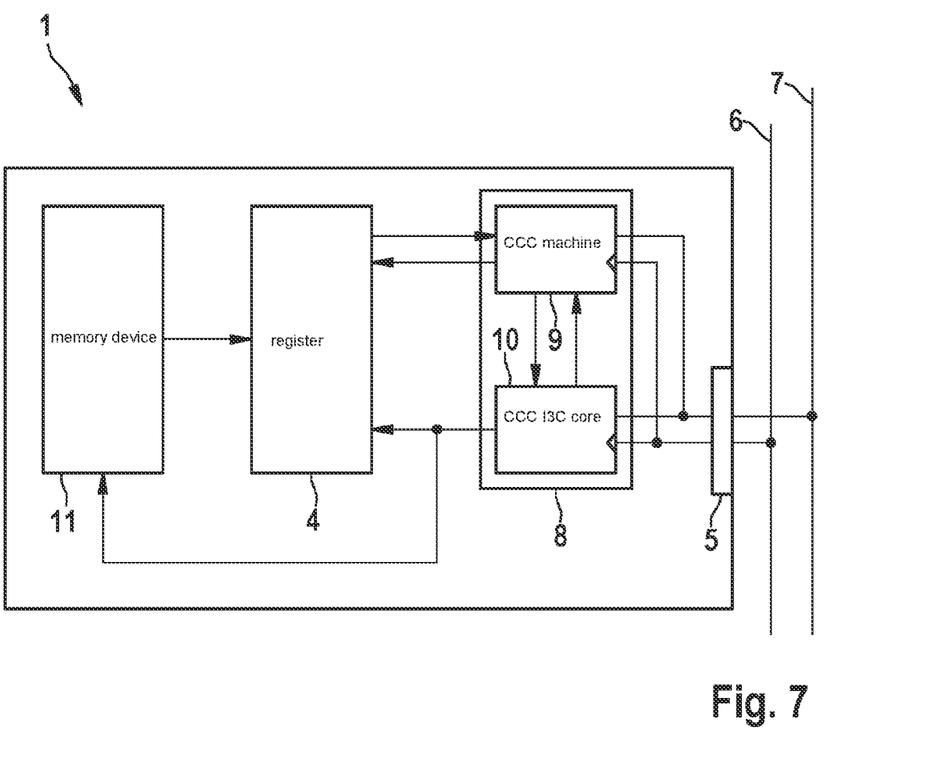
FIG. 7 shows a schematic representation in order to describe a system component according to a fourth example embodiment of the present invention.

FIG. 7 is a schematic representation in order to describe a system component according to a fourth embodiment.

FIG. 7 shows a combination of the variants of FIGS. 1, 4 and 5. System component 1 shown in FIG. 7 includes a memory device 11 via which register 4 is configurable. In addition, register 4 is configurable via custom command codes and also via a private protocol. In addition, memory device 11 has a connection to processor 8. Via this connection, the value stored in memory device 11 is able to be configured and loaded via custom command codes and via a private protocol. Memory device 11 is designed to provide register 4 with corresponding configuration data for the configuration of the function scope of system component 1.

What is claimed is:

1. A system component, comprising:
   an interface for a data bus for communicating with at least one further system component, a defined communications protocol being provided on the data bus for transmitting and receiving of data and bus commands, and the communications protocol provides that the at least one further system component queries a communication behavior of the system component via the data bus to adapt its own communication behavior to that of the system component; and
   a register for configuration data that define the communication behavior of the system component on the data bus, the register being connected to the data bus so that the configuration data stored in the register are available on the data bus;
   wherein a function scope of the system component allows for different communication behaviors, and the communication behavior of the system component is selectable within a framework of the function scope in that configuration data corresponding to the selected communication behavior are loadable into the register,
   wherein there is at least one internal or external memory device for the configuration data, and
   wherein the register, which includes a bus characteristic register (BCR) register, receives a value from the memory device prior to initialization of the system component, wherein the value is used to configure a communication behavior of the system component, in which an in-band interrupt (IBI) function with or without payload is configured to provide the way in which the system component communicates via the data bus, and wherein at least one processor unit is configured to provide a custom command code (CCC) machine and a CCC I3C core, and
   wherein the I3C CCC core is connected to the register, wherein no configuration of the register takes place via the custom command codes of the I3C bus protocol, wherein read and write requests are provided via the direct connection of the I3C CCC core to the register, wherein the communication between the master and the slave is defined in a private protocol, which is executed on the I3C CCC core, and wherein the master can write to and read from the BCR register, the address of the register being defined in the private protocol as are commands for the reading from the register and the writing to the register.

2. The system component as recited in claim 1, wherein the system component is I2C-compatible and/or I3C-compatible.

3. The system component as recited in claim 1, wherein the function scope allows for an operation alternatively as a master or a slave.

4. The system component as recited in claim 1, wherein the function scope includes an in-band interrupt capability alternatively with payload or without payload.

5. The system component as recited in claim 1, and the configuration data corresponding to the selected communication behavior is loadable from the memory device into the register.

6. The system as recited in claim 5, wherein the memory device is a non-volatile memory.

7. The system component as recited in claim 1, wherein the communication behavior is selectable based on bus commands and/or data received via the data bus, and corresponding configuration data are loadable into the register.

8. The system component as recited in claim 7, wherein at least one internal or external memory device for the configuration data is provided, and the configuration data corresponding to the selected communication behavior is loadable from the memory device into the register, and wherein the communication behavior is selectable based on the bus commands and/or data received via the data bus, and corresponding configuration data are loadable into the memory device and loadable from the memory device into the register.

9. The system component as recited in claim 1, wherein a sensor component for acquiring and converting measuring variables into electrical sensor signals are involved.

10. A method for operating a system component, the method comprising:
configuring the communication behavior of the system component by loading configuration data corresponding to a selected communication behavior into the register;
wherein the system component is connected for communication with least one further system component via at least one interface to a data bus on which a defined communications protocol is used for transmitting and receiving of data and bus commands, the communications protocol providing that the at least one further system component queries a communication behavior of the system component via the data bus to adapt its own communication behavior to that of the system component, the system component including at least one register for the configuration data that define the communication behavior of the system component, the register being connected to the data bus so that the configuration data stored in the register are available on the data bus, and a function scope of the system component allows for different communication behaviors on the data bus,
wherein there is at least one internal or external memory device for the configuration data,
wherein the register, which includes a bus characteristic register (BCR) register, receives a value from the memory device prior to initialization of the system component, wherein the value is used to configure a communication behavior of the system component, in which an in-band interrupt (IBI) function with or without payload is configured to provide the way in which the system component communicates via the data bus, and wherein at least one processor unit is configured to provide a custom command code (CCC) machine and a CCC I3C core, and
wherein the I3C CCC core is connected to the register, wherein no configuration of the register takes place via the custom command codes of the I3C bus protocol, wherein read and write requests are provided via the direct connection of the I3C CCC core to the register, wherein the communication between the master and the slave is defined in a private protocol, which is executed on the I3C CCC core, and wherein the master can write to and read from the BCR register, the address of the register being defined in the private protocol as are commands for the reading from the register and the writing to the register.

11. The method as recited in claim 10, wherein the configuration data are loaded into the register after the system component has been switched on in each case, but prior to a first query of the communication behavior by the further system component.

12. The method as recited in claim 10, wherein the configuration data are loaded into the register from an internal or external memory device for configuration data.

13. The method as recited in claim 12, wherein the memory device is a non-volatile memory.

14. The method as recited in claim 12, wherein the communication behavior is configured based on at least one predefined and/or device-specific bus command, and corresponding configuration data are loaded into the register or the memory device.

15. The method as recited in claim 12, wherein the communication behavior is configured based on at least one predefined and/or device-specific data communication, and corresponding configuration data are loaded into the register or the memory device.

\* \* \* \* \*